(12) United States Patent
Gu et al.

(10) Patent No.: US 7,385,976 B2
(45) Date of Patent: Jun. 10, 2008

(54) METHOD FOR ACKNOWLEDGING DATA PACKETS IN A NETWORK

(75) Inventors: Daqing Gu, Burlington, MA (US);
Zhifeng Tao, Brooklyn, NY (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 854 days.

(21) Appl. No.: 10/917,053

(22) Filed: Aug. 12, 2004

(65) Prior Publication Data

US 2006/0034247 A1 Feb. 16, 2006

(51) Int. Cl.
*H04L 12/56* (2006.01)
*H04Q 7/24* (2006.01)

(52) U.S. Cl. ........................... 370/389; 370/338
(58) Field of Classification Search ............... 370/252, 370/389, 338, 473, 395.2, 476, 477; 709/236, 709/237; 714/48
See application file for complete search history.

(56) References Cited

U.S. PATENT DOCUMENTS

2003/0135640 A1* 7/2003 Ho et al. .................... 709/237
2006/0034277 A1* 2/2006 Jang et el. .................. 370/389

* cited by examiner

*Primary Examiner*—Doris H. To
*Assistant Examiner*—Feben Micael Haile
(74) *Attorney, Agent, or Firm*—Drill Brinkman; Clifton D. Mueller; Gene V. Vinokur

(57) ABSTRACT

A method selectively acknowledges data packets in a network including a multiple stations connected by a common wireless channel. A transmitting station requests a block acknowledgement from a receiving station. The transmitting station transmits a block of data packets to the receiving station. The receiving station determines a number of successfully received data packets and a number of incorrectly received packets. Then, the receiving station selectively acknowledges only the successfully received data packets if the number of usefully received data packets is less than the number of incorrectly received data packets, and otherwise acknowledging only the incorrectly received packets.

9 Claims, 12 Drawing Sheets

METHOD FOR ACKNOWLEDGING DATA PACKETS IN A NETWORK

FIELD OF THE INVENTION

This invention relates generally to wireless communications networks, and more particularly to acknowledging received packets in such networks.

BACKGROUND OF THE INVENTION

In a wireless local area network (WLAN) according to the IEEE 802.11 standard, an access point (AP) in a cell coordinates packet transmission for all the stations associated with the cell. A single wireless channel, i.e., frequency band, is shared by both the uplink from the station to the AP, and the downlink from the AP to the station for data and control signals. Every station can communicate with the AP, whereas it is not required for any two stations to be within communication range of each other.

The transmission rate of the wireless channel can vary, depending on a perceived signal-to-noise ratio (SNR). For example, the physical layer of the IEEE 802.11b standard supports four rates at 1 Mbps, 2 Mbps, 5.5 Mbps and 11 Mbps.

IEEE 802.11 Acknowledgement

According to the current IEEE 802.11 standard, "Wireless LAN Medium Access Control (MAC) and Physical Layer (PHY) Specifications", Standard, IEEE, August, 1999, for wireless local area networks (WLANs), a receiver must explicitly acknowledge a correct reception of a data packet by sending an acknowledgement (ACK) message to the sender. Because the ACK message is directly associated with a previous data packet received, the ACK message has a very simple format.

IEEE 802.11e Block Acknowledgement (BlockACK)

To improve the efficiency of the wireless channel usage, IEEE 802.11e Task Group (TGe) developed a block acknowledgement technique and defines a set of new messages, IEEE 802.11e, "Wireless LAN Medium Access Control (MAC) and Physical Layer (PHY) Specifications: Medium Access Control (MAC) Enhancements for Quality of Service (QoS)", Draft v6, IEEE, November 2003. There, a single but more complex ACK message is used to acknowledge multiple consecutive data packets, instead of one simple ACK message for every data packet.

Therefore, the IEEE 802.11e standard uses an additional QoS control field in the MAC header. That field includes a two-bit ACK policy subfield, which specifies the type of ACK policy that is used.

A block ACK session is comprised of establishment, data transfer, BlockACK, and termination phases. Prior to the block data transfer, an Add BlockACK (ADDBA) request and an Add BlockACK (ADDBA) response are exchanged, and parameters are negotiated between two stations involved in the session. A BlockACK timeout value is specified, upon the expiry of which, the block ACK session is terminated.

Table 1 and Table 2 show the contents of the ADDBA request and response frames, respectively. For a detailed description of each field see the standard.

TABLE 1

| Order | Information | Value |
|---|---|---|
| 1 | Category | Set to 3, for BlockACK |
| 2 | Action | Set to 0, ADDBA request |

TABLE 1-continued

| Order | Information | Value |
|---|---|---|
| 3 | Dialog Token | Set to a non-zero value chosen by the station |
| 4 | BlockACK Parameter Set | |
| 5 | BlockACK Timeout Value | |

TABLE 2

| Order | Information | Value |
|---|---|---|
| 1 | Category | Set to 3, for BlockACK |
| 2 | Action | Set to 1, for ADDBA response |
| 3 | Dialog Token | Copy from the corresponding ADDBA request |
| 4 | Status Code | |
| 5 | BlockACK Parameter Set | |
| 6 | BlockACK Timeout Value | |

Upon the establishment of the BlockACK session, the sender can transmit blocks of data packets, separated by a short inter-frame space (SIFS) period. The session establishment is performed for a flow, which may last for thousands or even millions of packets over a time period of seconds to minutes, hours or even days.

To request an acknowledgement of an outstanding data packet, the sender transmits a BlockAckRequest message to the receiver. The BlockACK sequence control field is set to the same value as in the immediately previous BlockAck-Request message received. The BlockACK bitmap field included in the BlockACK has 128 octets and indicates the receiving status of up to 64 MAC service data units (MS-DUs) or packets.

Figure 1:
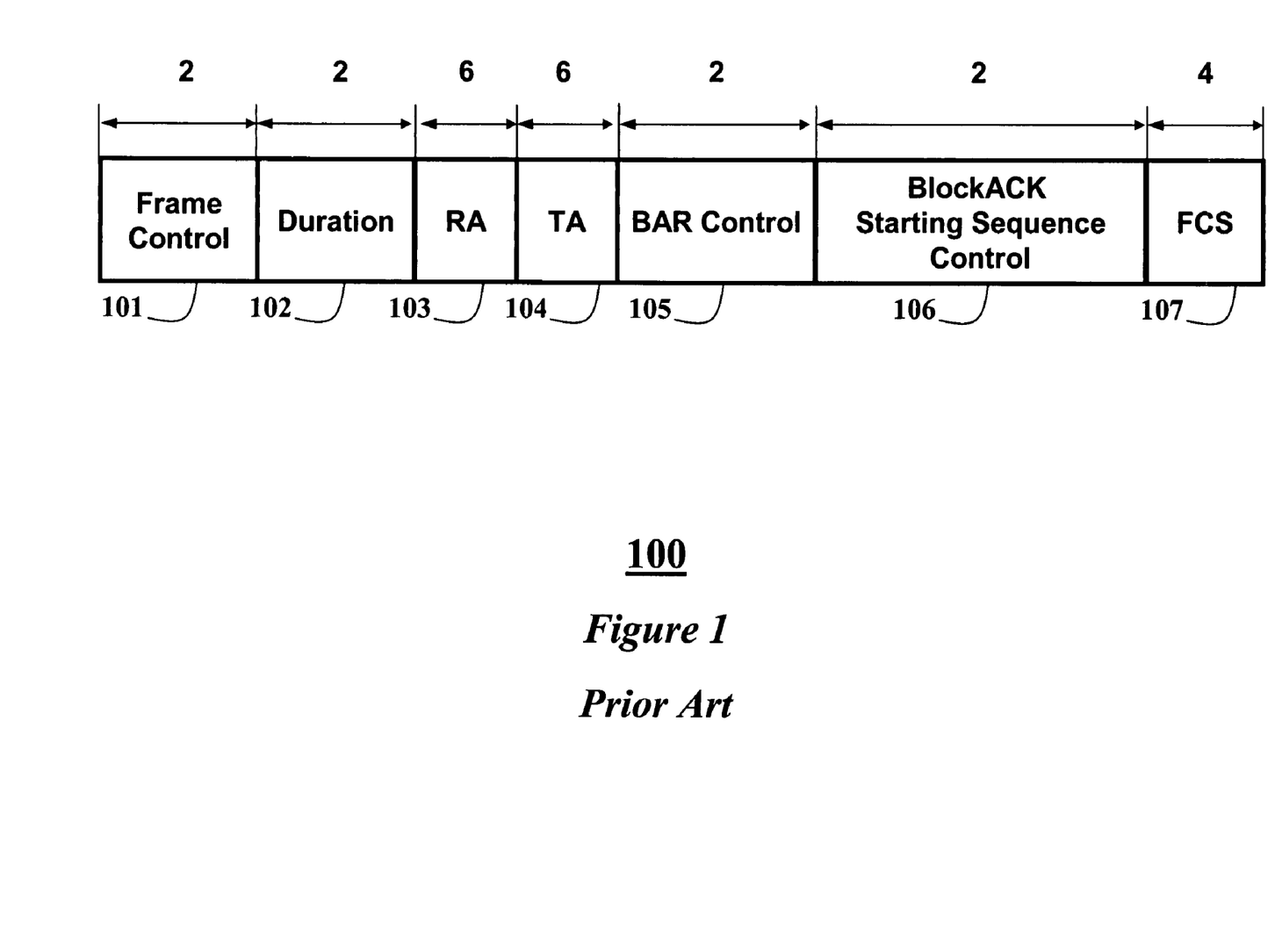
FIG. 1 is a block diagram of a prior art BlockAckReq frame format.
Figure 2:
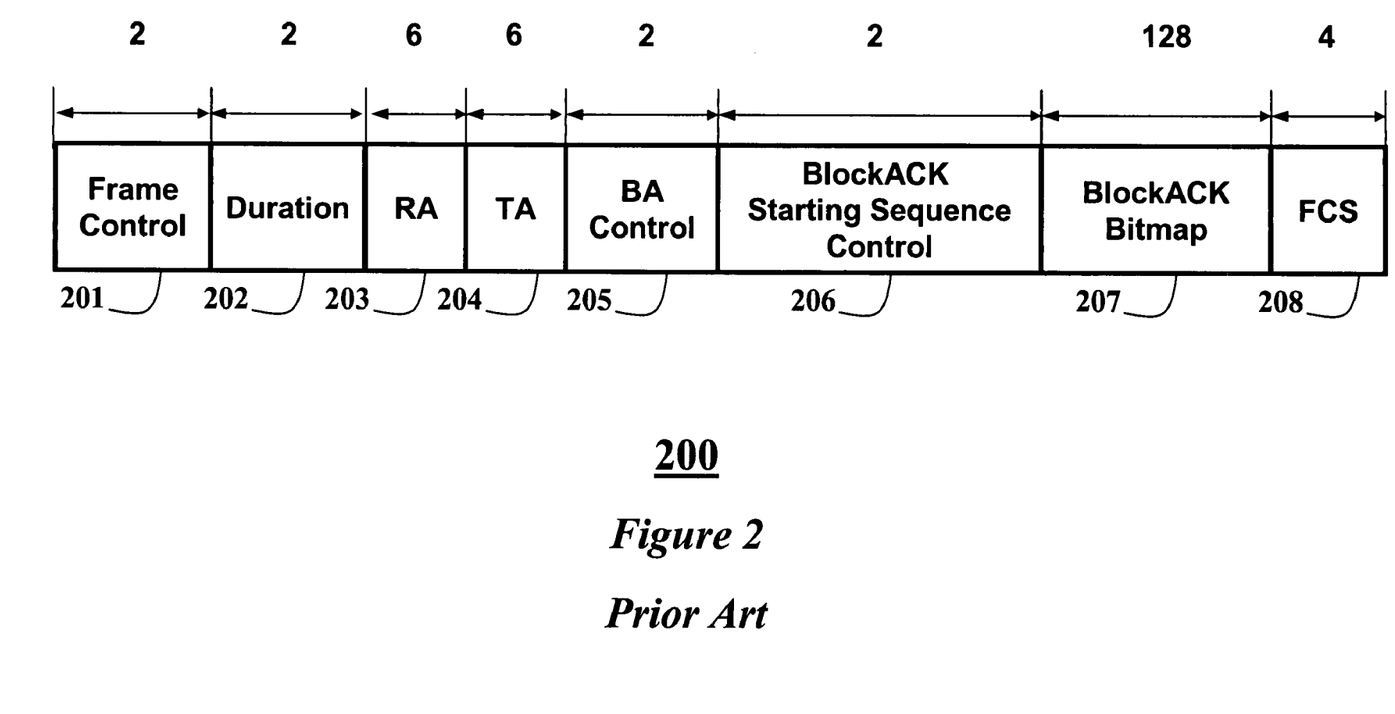
FIG. 2 is a block diagram of a prior art BlockACK frame format.

FIG. 1 shows bytes of a format 100 of a BlockACKReq message, and FIG. 2 shows bytes of a format 200 of a BlockACK message as defined in the IEEE 802.11e standard. In all figures, the numeral above the various fields indicates (I changed the figures so that numerals above the fields only indicate number of bytes) byte allocations.

The BlockACKReq message 100 includes the following fields: bit frame control 101, duration 102, receiver address (RA) 103, transmitter address (TA) 104, BlockACK Request (BAR) control 105, starting sequence control 106, and frame check sequence (FCS) 107.

FIG. 2 includes the following fields: frame control 201, duration 202, receiver address (RA) 203, transmitter address (TA) 204, BlockACK (BA) control 205, BlockACK starting sequence control 206, BlockACK bitmap 207, and frame check sequence (FCS) 208.

Figure 3:
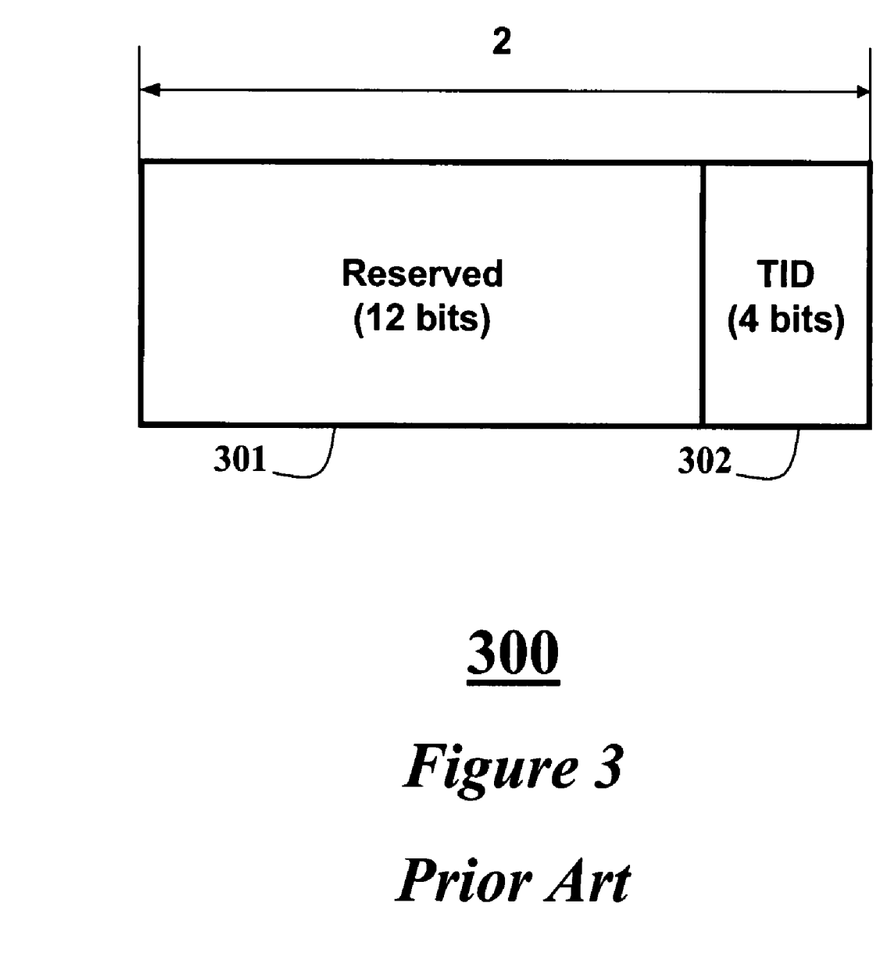
FIG. 3 is a block diagram of a prior art BAR/BA control field.

FIG. 3 shows bits of the BlockACKRequest (BAR) control field and BlockACK (BA) field, which have a format 300. The most significant four bits of the BAR/BA field are the TID subfield 302. The least significant twelve bits in the BAR/BA field are reserved 301.

Figure 4:
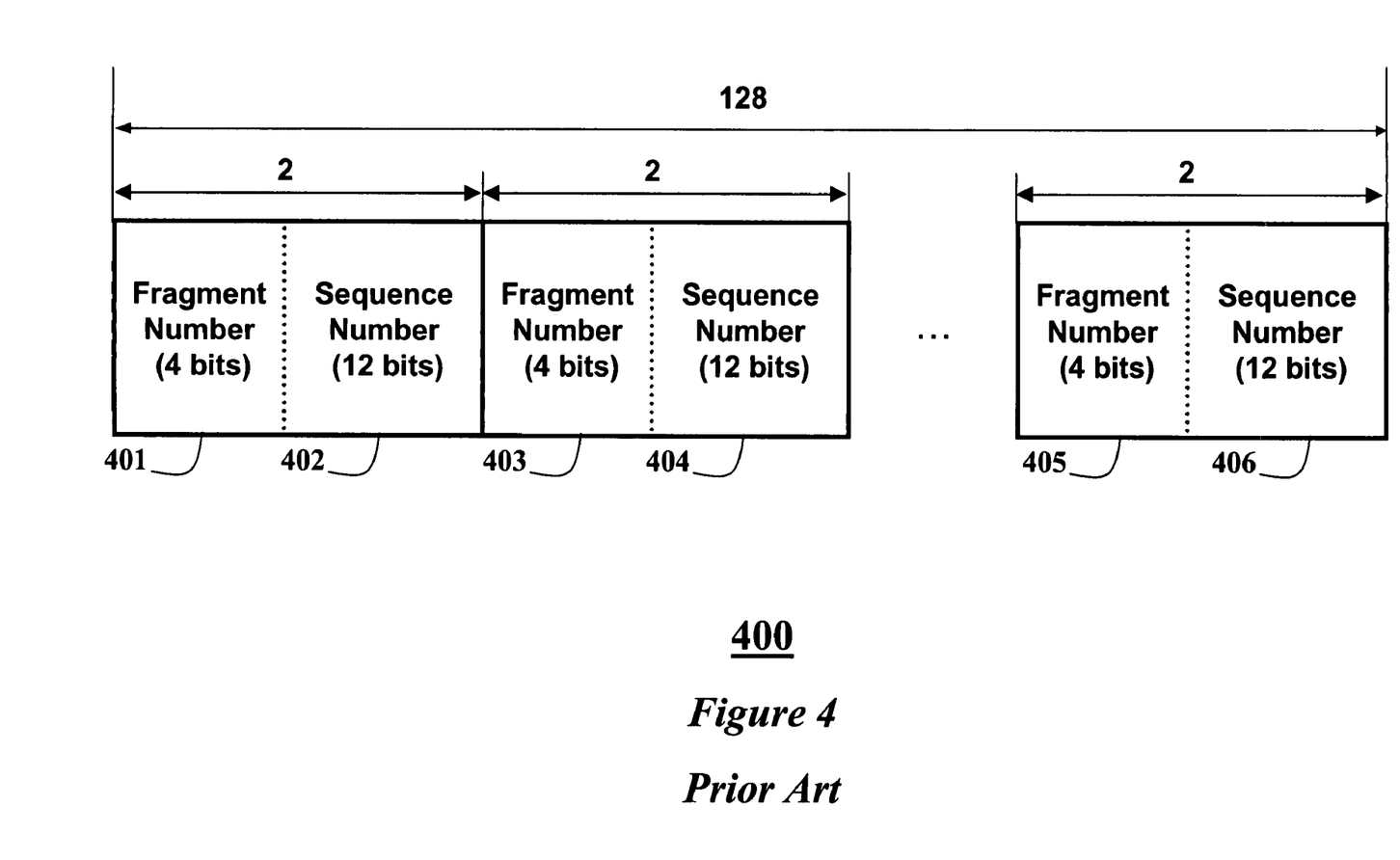
FIG. 4 is a block diagram of a prior art Block ACK bitmap format.

FIG. 4 shows a format 400 of the BlockACK bitmap field in the BlockACK message. The BlockACK bitmap includes 64, two-byte-long sequence control numbers comprising fragment numbers 401, 403 and 405, each followed by sequence numbers 402, 404, and 406.

Figure 5:
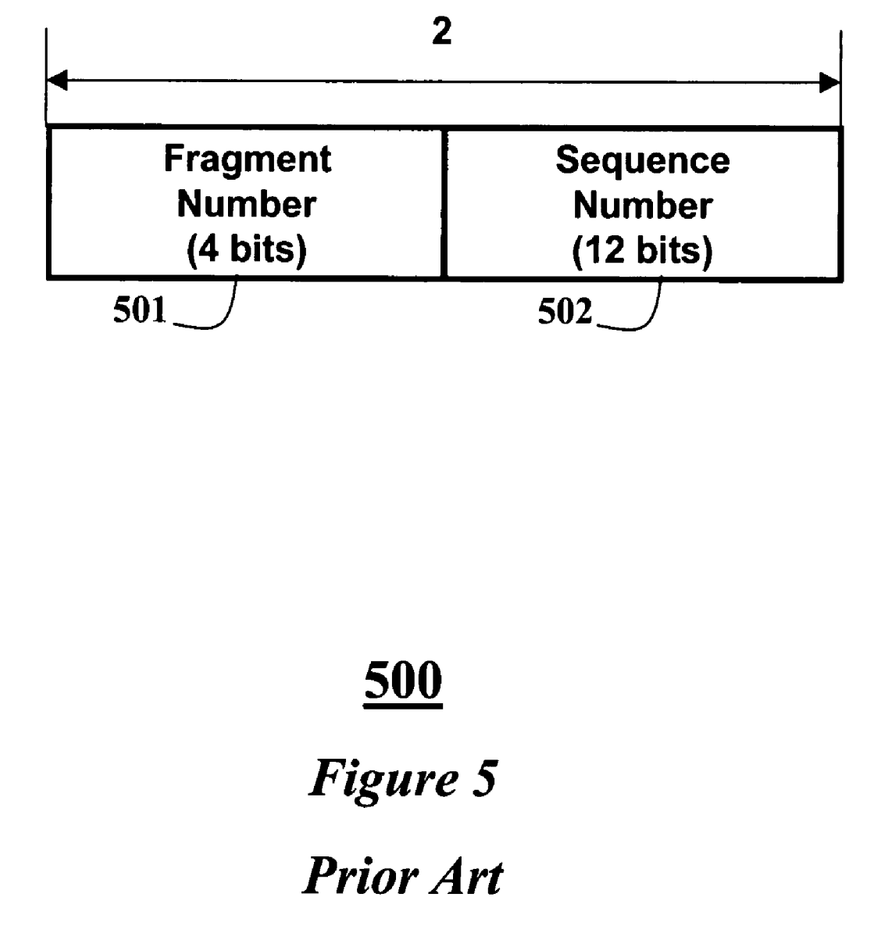
FIG. 5 is a block diagram of a prior art sequence control field.

As shown in more detail in FIG. 5, each two-byte-long sequence control number 500 uniquely identifies one data packet that has been received. The sequence number field is comprised of a 12-bit-long sequence number 502 and a 4-bit long fragment number 501. The fragment number is used by fragmentation and the reassembly process.

Limitations of Current BlockACK

In any network, bandwidth is an important resource. For a high throughput WLAN according to the IEEE 802.11n standard, the MAC protocol must achieve a 70-80% efficiency to meet the design requirement of 100 Mbps at the MAC service access point (SAP). Therefore, the current MAC protocol must be improved.

However, the per frame ACK mechanism according to the current IEEE 802.11 standard presents a potential source of huge waste of the wireless channel. This is the exact reason why BlockACK is proposed in the IEEE 802.11e standard. Unfortunately, the BlockACK mechanism itself is not entirely optimized with respect to the bandwidth efficiency.

The BlockACK bitmap field in the BlockACK frame has a fixed length of 128 bytes. Thus, for any number of data packets transmitted as a block using the BlockACK, the 128-byte-long BlockACK bitmap must be included in the BlockACK. This causes significant waste and inflexibility for small blocks.

Moreover, the current BlockACK message has the constraint that the acknowledgement must be for data belonging to the same traffic class (TC) or traffic stream (TS). Currently, the transmission opportunity (TXOP) obtained by contention (ECCA-TXOP) or allocated by polling (HCCA-TXOP) is always associated with a particular TC or TS, and only the data packets of that TC or TS can be transmitted during the TXOP.

Therefore, a better block acknowledgement method is desired.

SUMMARY OF THE INVENTION

The IEEE 802.11n standard requires that a throughput of 100 Mbps at the medium access control (MAC) layer of a service access point (SAP). Various mechanisms in the current IEEE 802.11/IEEE 802.11e MAC protocols entail immense overhead and eventually result in serious throughput performance degradation. Direct application of the current MAC protocol on the IEEE 802.11n standard is not practical.

Therefore, the invention provides an improved block acknowledgement method. This method uses less bandwidth than the prior art block acknowledgement scheme. The method uses reserved fields in the IEEE 802.11/IEEE 802.11e MAC frames to accomplish a wide range of new functionalities, which are not available in the prior art IEEE 802.11/IEEE 802.11e MAC protocols. Analysis shows that the invented method improves efficiency by 70% or higher.

Specifically, a method selectively acknowledges data packets in a network including a multiple stations connected by a common wireless channel.

A transmitting station requests a block acknowledgement from a receiving station. The transmitting station transmits a block of data packets to the receiving station.

The receiving station determines a number of successfully received data packets and a number of incorrectly received packets.

Then, the receiving station selectively acknowledges only the successfully received data packets if the number of usefully received data packets is less than the number of incorrectly received data packets, and otherwise acknowledging only the incorrectly received packets.

DETAILED DESCRIPTION OF THE PREFERRED EMBODIMENT

The invention provides a method for acknowledging blocks of data packets in wireless local area networks (WLANs) designed according to the IEEE 802.11 standard. The method uses a variable sized field in a BlockACK bitmap. The BlockACK field can signal data packets that have been received successfully or incorrectly, whichever takes fewer bits.

Generally, a condition of a physical channel tends to be stable, rather than fluctuating. Therefore, rate adaptation optimizes a transmission rate to achieve a reasonably low packet error rate (PER). Thus, the probability of persistent occurrence of packet errors is low. This implies that most data packets are received successfully, and the BlockACK field only needs to indicate the data packets that have been received incorrectly.

The method supports flexible acknowledgement for multiple traffic classes (TC) and traffic streams (TS). The method can be used for a transmit opportunity (TXOP) obtained by contention during an enhanced distributed channel access (EDCA) period, and by a TXOP assigned by an access point (AP) during a hybrid coordinated channel access (HCCA) period.

The method includes session establishment, data exchange, block acknowledgement, and termination phases and can operate in two modes.

Mode 1

An ADDBA request message and an ADDBA response message are exchanged between a sender and a receiver when a session is established. A BlockACK parameter set fixed field contained in both the ADDBA request message and the ADDBA response messages is used to negotiate parameters for the BlockACK session to be established.

Table 3 shows all possible ACK modes that can be initiated by the ADDBA request according to the IEEE 802.11e standard.

TABLE 3

| Bit 5 | Bit 6 | Meaning |
|---|---|---|
| 0 | 0 | Normal acknowledgement |
| 1 | 0 | No acknowledgement |
| 0 | 1 | No explicit acknowlededgement |
| 1 | 1 | Block acknowledgement |

Table 4 shows a traffic ID (TID) subfield within the BlockACK parameter set fixed field that specifies the TC or TS for the session.

TABLE 4

| Bits 0-3 | Usage |
|---|---|
| 0-7 | User Priority (UP) for prioritized QoS (TC) |
| 8-15 | TSID for parameterized QoS (TS) |

Figure 6:
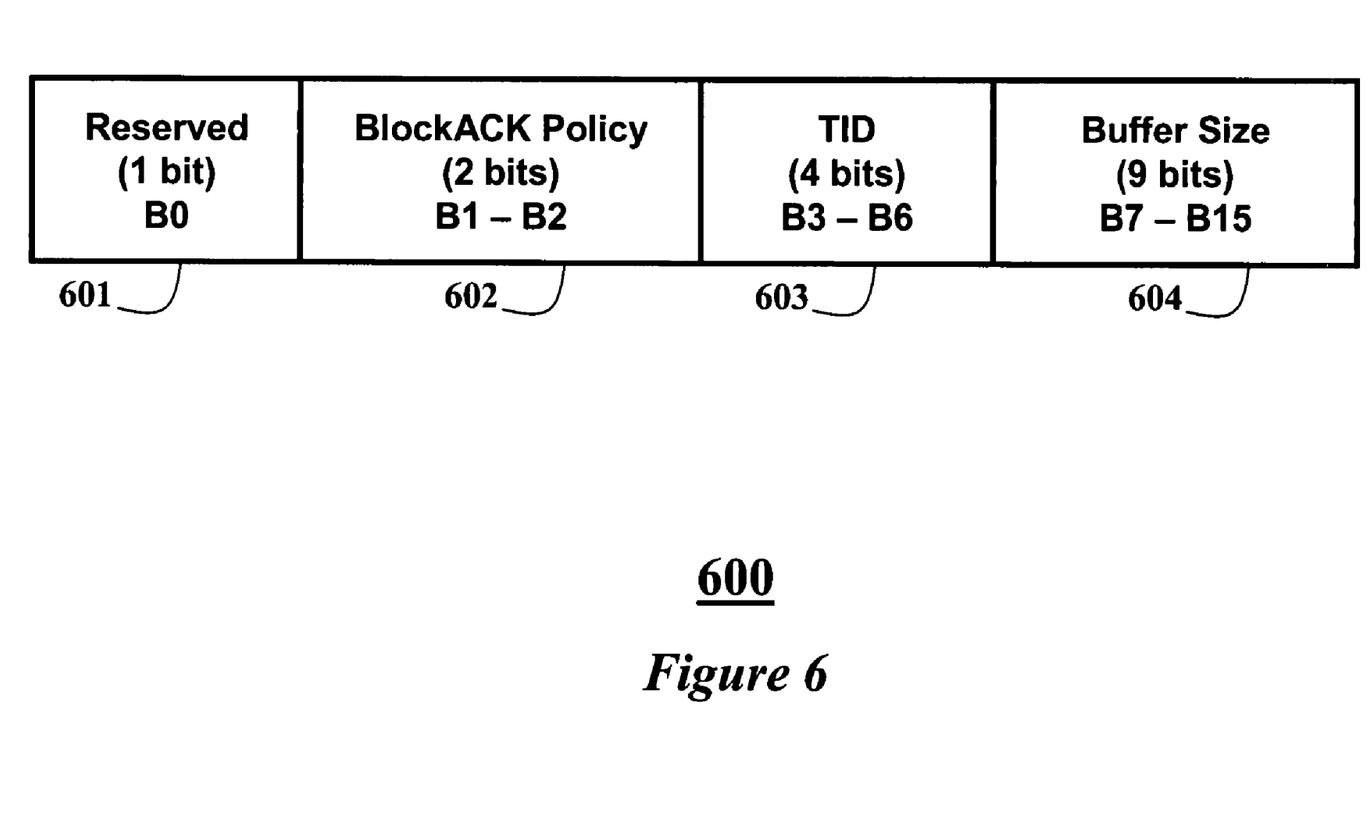
FIG. 6 is a block diagram of a BlockACK parameter set fixed field according to the invention.

FIG. 6 shows bits of a format 600 of the BlockACK parameter set fixed field. We use the reserved bit (B0) 601 of the prior art BlockACK parameter set fixed field to indicate whether multiple TIDs 603 are supported in a block transmission session. If B0 is one, then mixed traffic according to the invention is enabled, otherwise, if zero, mixed traffic is disabled.

Because the BlockACK parameter set fixed field is contained in the ADDBA request message and the ADDBA response message, two stations involved in the session can negotiate whether to support this mixed mode or not. Field 602 stores the two-bit-long BlockACK policy, see Table 3, and field 604 the buffer size.

Specifically, the ADDBA request initiates the negotiation by setting bit B0 appropriately. Then, the receiver returns the ADDBA response message with the B0 bit set to its capability and corresponding ADDBA request message. After this exchange, both stations can determine whether or not mixed traffic can be used during the session.

After the session is established, data packets can be transmitted. If the sender needs to confirm whether the transmitted data packets have been received successfully by the receiver, then the sender requests a BlockACK from the receiver, by sending a BlockACKReq message.

Figure 7:
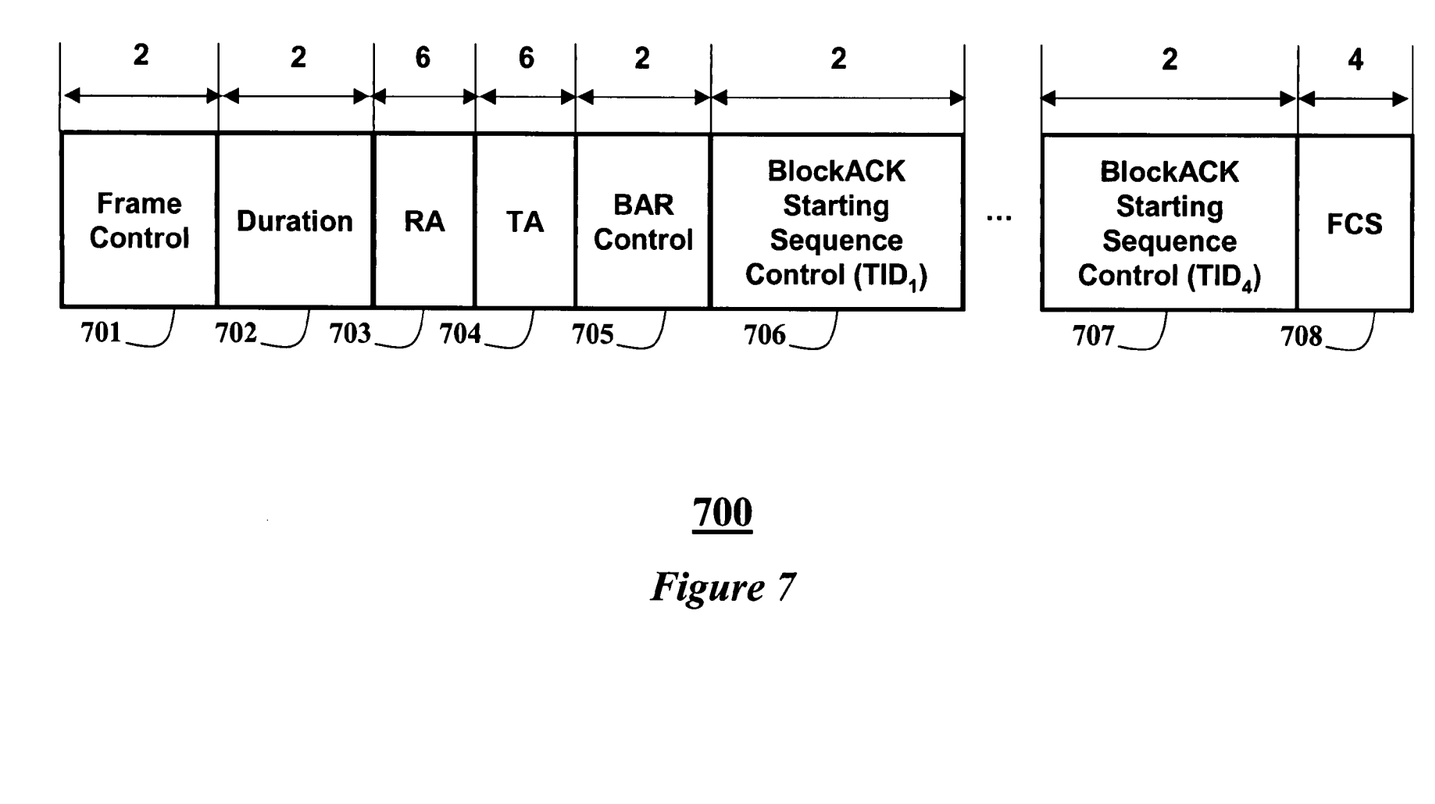
FIG. 7 is a block diagram of a BlockACKReq message according to the invention.
Figure 8:
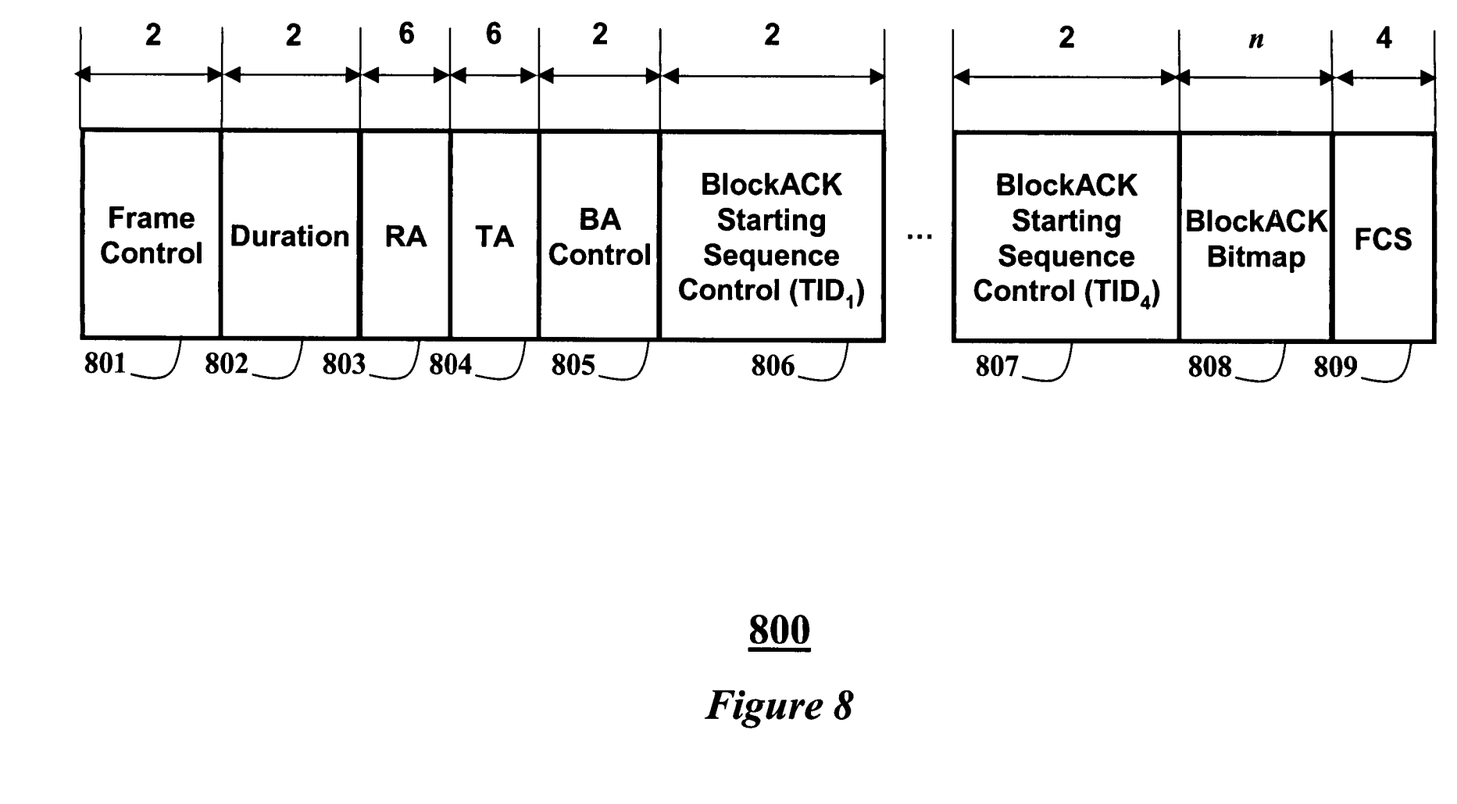
FIG. 8 is a block diagram of a BlockACK message according to the invention.

A format of a BlockACKReq message 700 and a BlockACK message 800 according to the invention are shown in FIG. 7 and FIG. 8, respectively. The format 700 includes frame control 701, duration 702, receiver address 703, transmitter address 704, BAR control 705, sequence controls 706-707, and FCS 708 fields. The format 800 includes frame control 801, duration 802, receiver address 803, transmitter address 804, BA control 805, sequence controls 806-807, BlockACK bitmap including n bytes 808, and FCS 809 fields.

To enhance the BlockACK flexibility and efficiency, the invention uses a reserved 12-bit-long field in the BAR/BA control field of the BlockACKReq and BlockACK messages.

Figure 9:
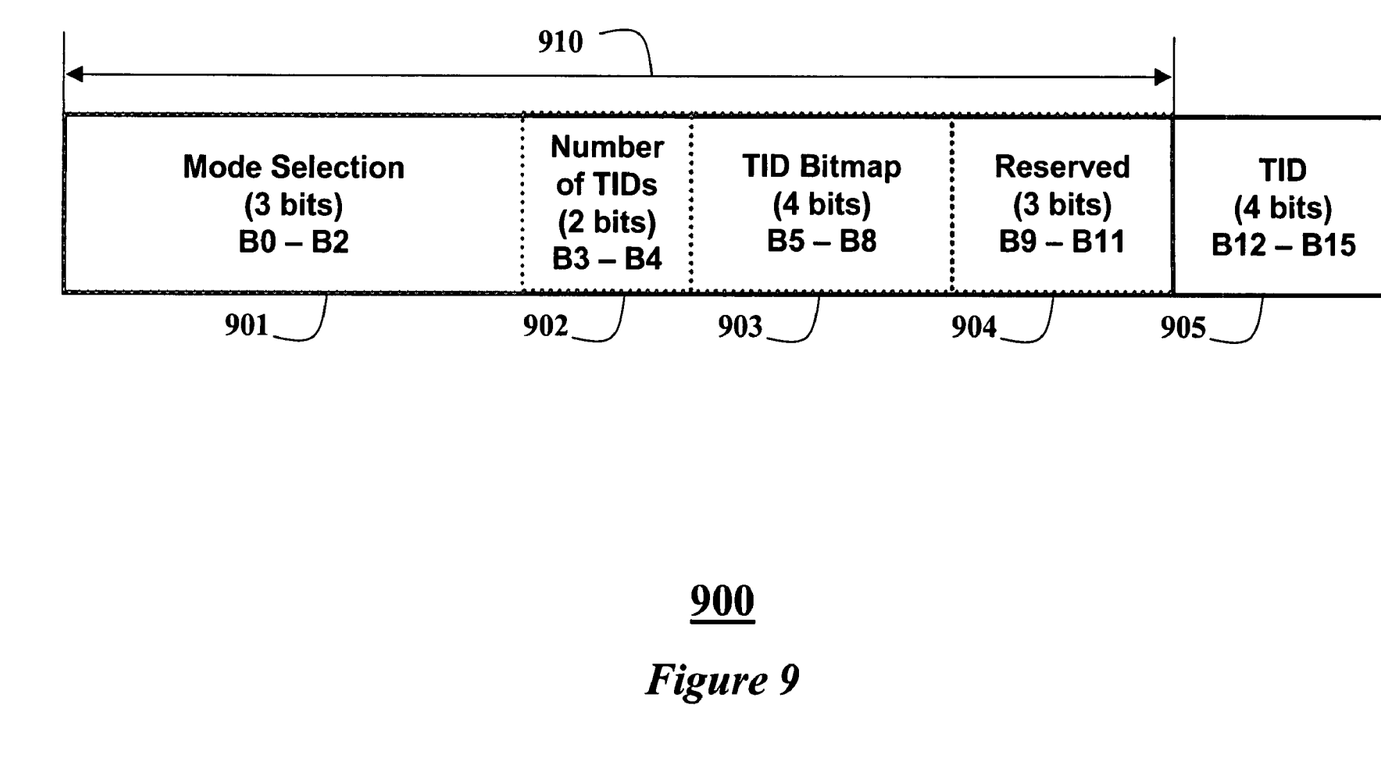
FIG. 9 is a block diagram of a BAR/BA field for a first acknowledgement mode according to the invention.

FIG. 9 shows a format 900 of the BAR control field for the mode 1. The design of the BA control field is similar, but for simplicity, only the BAR control field is shown in FIG. 9 and described below. The 12-bit-long field 910, which was reserved in the prior art, is divided into subfields. For mode 1, the least significant three bits (B0-B2) 901 are used for mode selection. All eight possible modes are listed in Table 5. The various fields, e.g., NACK, relative sequence number, etc., are described below.

In mode 1, the bits B3-B4 902 of the BAR control field are used to indicate the number of TIDs to be included in the current BlockACKReq message. Bits B5-B8 903 indicate the TIDs contained in the BlockACKReq message. For instance, if B5 is set to 1, then the BlockACK starting sequence control field for $TID_1$ is present in the BlockAckReq message. Bits B9-B11 904 are reserved. The TID field 905, B12-B15, represents the original TID for which the BlockACK session was established.

A valid data packet can only have one TC or one TS, but not both at the same time. Moreover, a block transmission of data packets can only occur in a contention period or contention free period, but not in both. Therefore, it is reasonable to assume that at any time, the BlockACKReq message can only pertain to either TC or TS, but not to both. This implies that only four valid TIDs are possible in any BlockACKReq message. Therefore, only two bits and four bits are allocated to the "Number of TIDs" field 902 and the "TID Bitmap" Field 903, respectively. This means that at most four BlockACK start sequence control fields can be included in a single BlockAckReq frame.

TABLE 5

| | Bit 0 | Bit 1 | Bit 2 | Meaning |
|---|---|---|---|---|
| 1 | 0 | 0 | 0 | Legacy BlockACK |
| 2 | 0 | 0 | 1 | Mode 2 |
| 3 | 0 | 1 | 0 | Mode 1, NACK disabled, relative sequence number disabled |
| 4 | 0 | 1 | 1 | Mode 1, NACK enabled, relative sequence number enabled |
| 5 | 1 | 0 | 0 | Mode 1, NACK disabled, relative sequence number enabled |
| 6 | 1 | 0 | 1 | Mode 1, NACK enabled, relative sequence number disabled |
| 7 | 1 | 1 | 0 | Reserved |
| 8 | 1 | 1 | 1 | |

The BlockACK starting sequence subfield included in both the BlockACKReq and BlockACK messages specify a sequence number of a starting data packet within a block of packets to be acknowledged. As shown in FIG. 5, the sequence control field is divided into two parts, the fragment number subfield 501 and the sequence number subfield 502, which are 4 bits and 12 bits, respectively.

Figure 10:
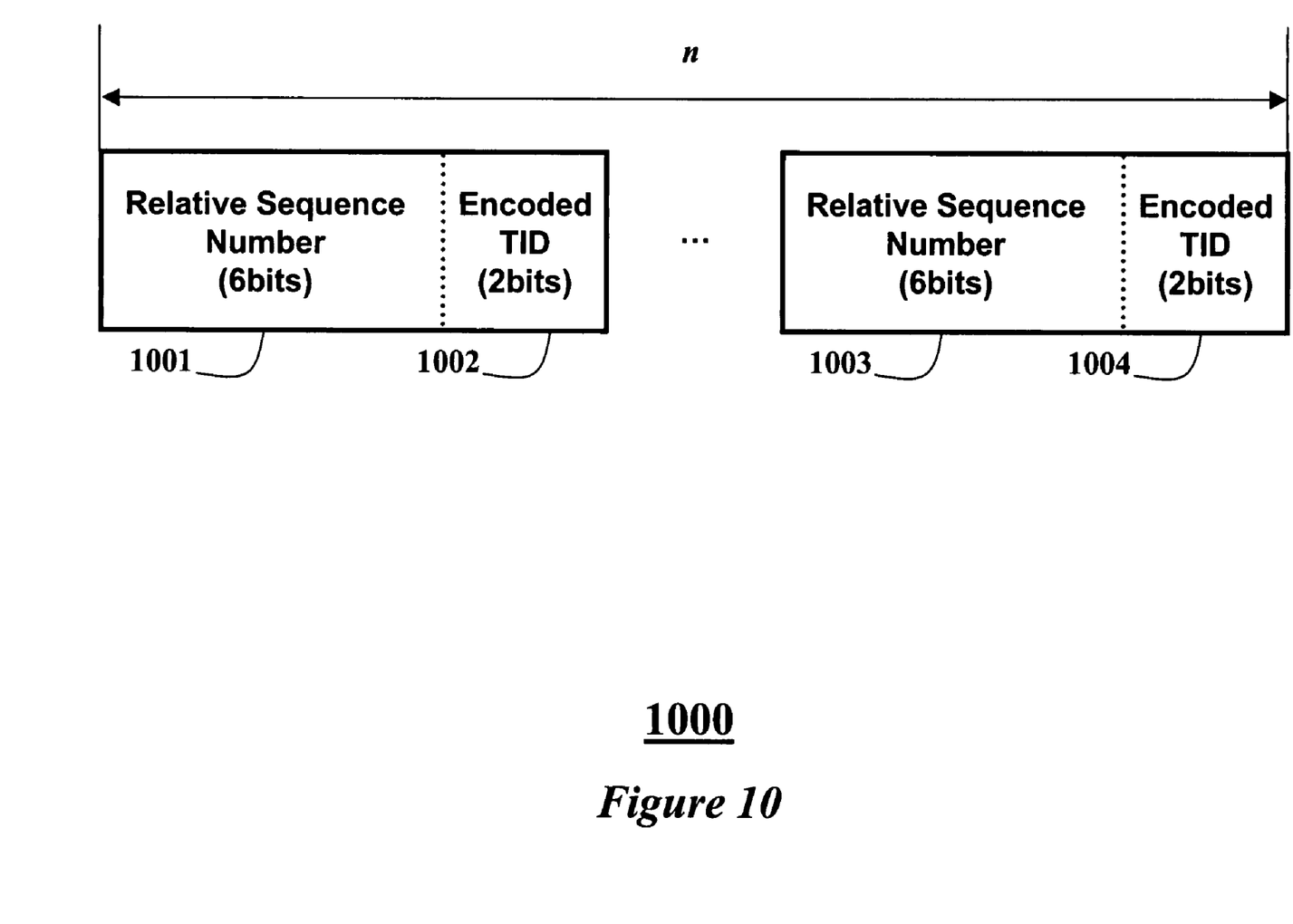
FIG. 10 is a block diagram of a BlockACK bitmap field for the first mode according to the invention.

A format of the BlockACK bitmap field 1000 for mode 1 is shown in FIG. 10. Instead of including a fixed length BlockACK bitmap as in the prior art, we can selectively acknowledge either the successfully received packets or the incorrectly received packets, whichever takes fewer bits.

If numbers of packets that are successfully and incorrectly received in a block of packets are N(succeed) and N(fail), respectively, and a total size of the block is N(total), then $$N(\text{succeed}) + N(\text{fail}) = N(\text{total}).$$

The number of bytes required for the prior art BlockACK bitmap Size(bitmap-prior-art) is $$\text{Size(bitmap-prior-art)} = 128 \text{ bytes}$$

The number of bytes required for the invented BlockACK bitmap Size(bitmap-invention) is $$\text{Size(bitmap-invention)} = 2 \times \min\{N(\text{succeed}), N(\text{fail})\}$$
$$= 2 \times \min\{N(\text{succeed}),$$
$$N(\text{total}) - N(\text{succeed})\}$$
$$\leq 2 \times [N(\text{total})/2]$$
$$\leq \text{Size(bitmap-prior-art)}/2 \text{ bytes}$$

That is, Size(bitmap-invention)≦Size(bitmap-prior-art)/2.

In other words, the acknowledgment method according to the invention uses half the number of bytes than the prior art scheme, in the worst case. Thus, using selective acknowledgement and negative ACK (NACK) adaptively can significantly reduce the number of sequence control fields in the BlockACK. The mode selection field of the new BAR/BA control field in the BlockACKReq message and the BlockACK message indicates whether positive or negative ACK is used.

The length n of the BlockACK bitmap is variable. For instance, if 64 data packets are transmitted and only 20 are received, then only 20 sequence numbers are in the BlockACK bitmap according to the invention. This represents an 80% savings when compared with the prior art BlockACK.

Because the starting sequence number for each TID is included in the BlockACK starting sequence field, there is no need to have complete sequence control fields sent back in the acknowledgement, as long as the data packets in the block have continuous sequence numbers.

Therefore, the invention can achieve a further saving by using a 6-bit-long relative sequence number (1001 and 1003), instead of using the 2-byte-long (16 bits) sequence number defined by the IEEE 802.11 standard. Six bits of a relative sequence number can represent at most 64 different data packets. The prior art BlockACK bitmap only supports up to 64 complete sequence numbers.

As shown in FIG. 10, the remaining 2 bits (1002 and 1004) can represents the encoded TID of the data being acknowledged. With this new enhancement, it becomes possible to transmit data packets of different traffic class in the same block.

In this case, Size(bitmap-invention)≦Size(bitmap-prior-art)/4

That is, the invention only needs one fourth of the bytes than the prior art BlockACK, even with a more flexible transmission scheme.

Mode 2

A second mode of the method of acknowledgement according to the invention can be used when the data packets have continuous sequence numbers. In mode 2, the establishment and the data exchange phases are identical to that of mode 1.

However, the BlockACKReq message and the BlockACK message are designed differently to provide simplicity. In fact, these two messages are almost like the prior art BlockACK messages, except that the BAR/BA field and the BlockACK bitmap field are optimized to achieve a better efficiency.

Figure 11:
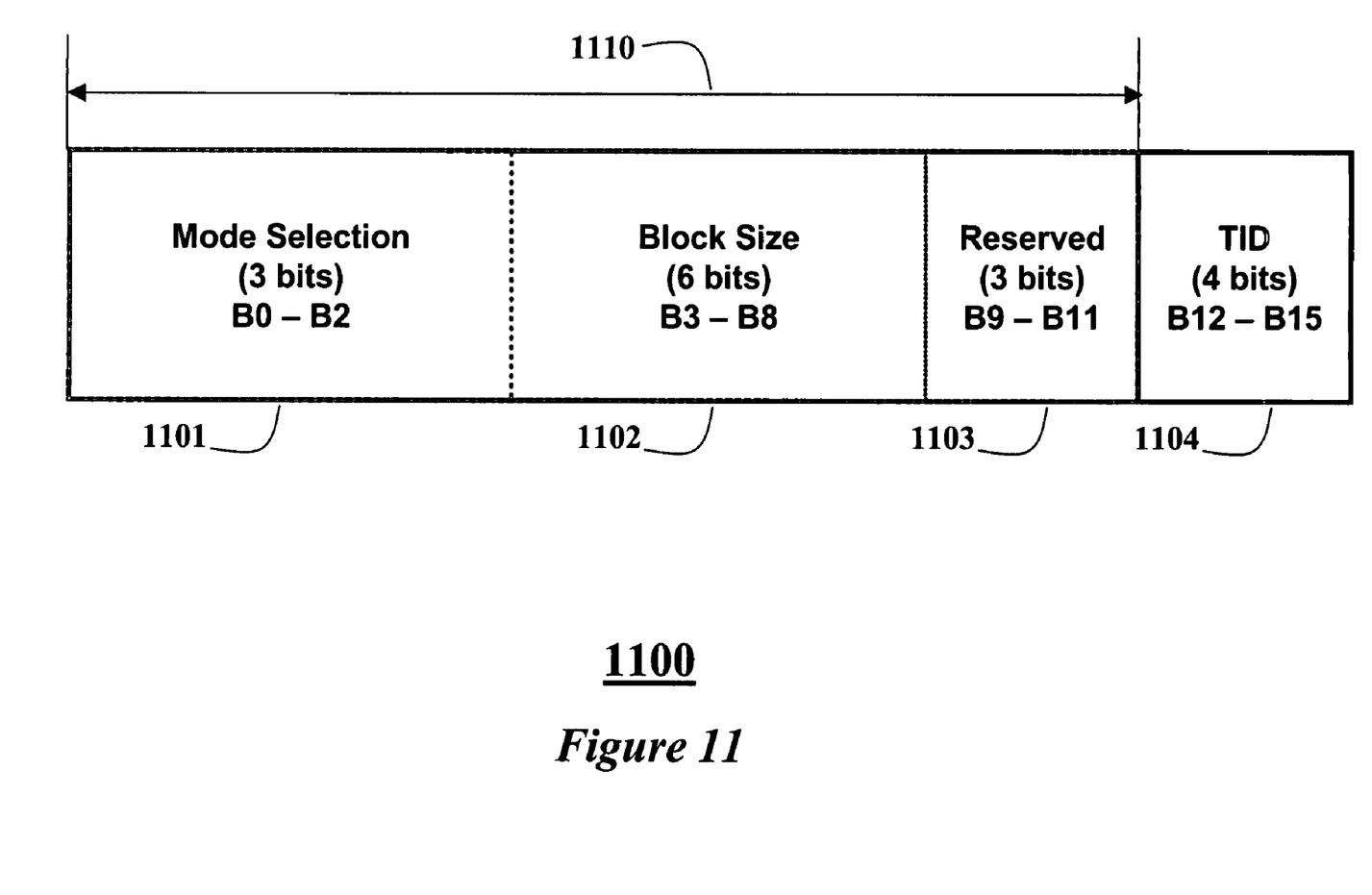
FIG. 11 is a block diagram of a BAR/BA field for a second acknowledgement mode according to the invention.

FIG. 11 shows the BAR/BA field 1100 for mode 2. The 12-bit-long field 1110, which was reserved in the prior art, is divided into subfields. The first three bits (B0-B2) constitute the mode selection field 1101, which has the same definition as the BAR/BA field for mode 1. Specifically, when the mode selection field has the value 0×0, mode 1 will be used.

The block size field 1102 (B3-B8) indicates how many packets are to be acknowledged in the BlockACK message. The block size field is six bits long, because the largest block size supported in mode 2 is 64 packets, which is the same size as that for the prior art BlockACK. Field 1103 is reserved, and field 1104 stores the TID.

Figure 12:
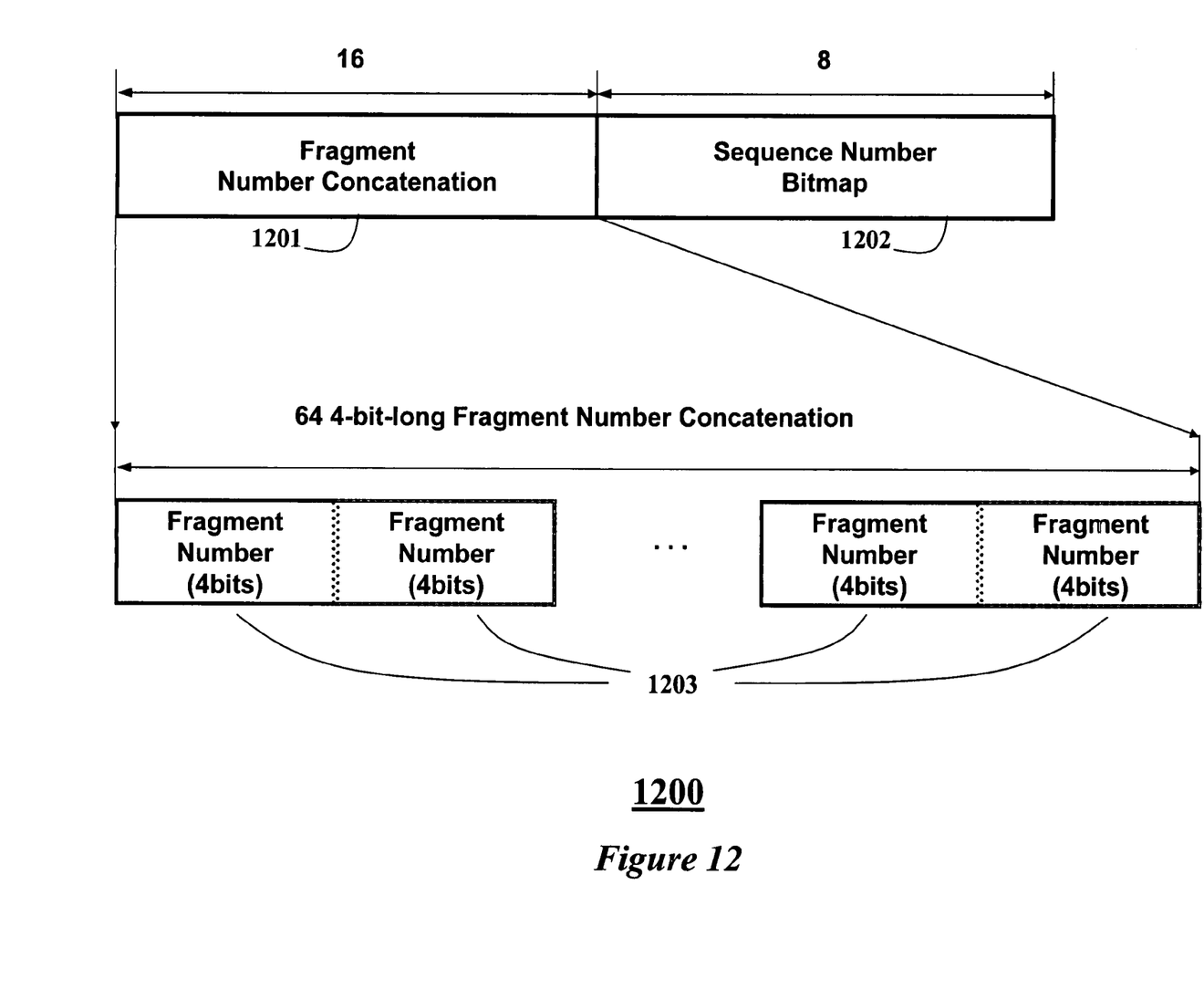
FIG. 12 is a block diagram of a BlockACK bitmap field for the second mode according to the invention.

FIG. 12 shows the BlockACK bitmap field 1200 for mode 2. This bitmap has a 32-byte-long fragment number concatenation field 1201 and an 8-byte-long sequence number bitmap field 1202. The fragment number concatenation field is a concatenation of the 4-bit fragment numbers 1203 for all the data packets to be acknowledged. Because the maximum number of packets in a block is 64, it is sufficient to use 16 bytes for this field. Each bit of the sequence number bitmap field indicates whether a particular packet has been received successfully or incorrectly. The relative position of the bit represents the sequence number. For instance, if the least significant bit of this bitmap field is set to 0, then the packet with sequence number (BlockACK starting sequence number+0)

has been received successfully.

It is possible to request a BlockACK before 64 packets have been transmitted. However, the bitmap field does not provide adequate logic to distinguish the case when a packet has not been transmitted at all, from the case when that packet has been received successfully or incorrectly. Therefore, the block size subfield is included in the BAR/BAR field for mode 2. For mode 2, the Size(bitmap-invention)=40, while Size(bitmap-prior-art)=40/128, a savings of 68.75%. If we further remove the fragment number concatenation field, we can achieve a saving of (1-8/128)=0.9375%

It should be noted that the operating mode can be selected depending on the application.

Implementation and Compatibility Issues

Setting the mode selection subfield of the BAR/BA control field in BlockAckReq and BlockAck messages to zero makes the method according to the invention compatible with the prior art.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for acknowledging data packets in a network including a plurality of stations connected by a common wireless channel, comprising:

requesting, by a transmitting station, a block acknowledgement from a receiving station;

transmitting, by the transmitting station, a block of data packets to the receiving station;

determining, in the receiving station, a number of successfully received data packets and a number of incorrectly received packets; and acknowledging only the successfully received data packets if the number of usefully received data packets is less than the number of incorrectly received data packets; and otherwise acknowledging only the incorrectly received packets.

2. The method of claim 1, in which the block acknowledgement request is for data packets of a single traffic class.

3. The method of claim 1, in which the block acknowledgement request is for data packets of a plurality of traffic classes.

4. The method of claim 1, in which the block acknowledgement request is for data packets of a single traffic stream.

5. The method of claim 1, in which the block acknowledgement request is for data packets of a plurality of traffic streams.

6. The method of claim 1, in which a bitmap in the block acknowledgement includes a full sequence number of each acknowledged data packet.

7. The method of claim 1, in which a bitmap in the block acknowledgement includes a relative sequence number of each acknowledged data packet.

8. The method of claim 1, in which a bitmap in the block acknowledgement includes a fragment number concatenation and a sequence number bitmap.

9. The method of claim 1, in a bitmap in the block acknowledgement includes only a sequence number bitmap.

* * * * *